US005079999A

United States Patent [19]

Negishi et al.

[11] Patent Number: 5,079,999

[45] Date of Patent: Jan. 14, 1992

[54] BENDABLE ACTUATOR

[75] Inventors: Koichi Negishi, Kodaira; Teruyoshi Sato, Kawasaki, both of Japan

[73] Assignee: Bridgestone Corporation, Tokyo, Japan

[21] Appl. No.: 540,552

[22] Filed: Jun. 19, 1990

[30] Foreign Application Priority Data

Jun. 23, 1989 [JP] Japan .................................. 1-159678

[51] Int. Cl.[5] .......................... F01B 19/00; B25J 11/00

[52] U.S. Cl. ............................................ 92/48; 92/92; 92/103 R; 901/27

[58] Field of Search ............. 92/91, 92, 103 R, 103 F, 92/103 SD, 48, 89, 47; 901/22, 27; 128/4

[56] References Cited

U.S. PATENT DOCUMENTS

| | | | |
|---|---|---|---|
| 3,284,964 | 11/1966 | Saito | 901/27 X |
| 3,645,173 | 2/1972 | Yarlott | 92/92 |
| 4,494,417 | 1/1985 | Larson et al. | 901/22 X |
| 4,502,280 | 3/1985 | McCoy | 92/48 X |
| 4,615,260 | 10/1986 | Takagi et al. | 92/92 |
| 4,777,868 | 10/1988 | Larsson | 92/47 X |
| 4,860,639 | 8/1989 | Sakaguchi | 92/92 X |
| 4,976,191 | 12/1990 | Suzumori et al. | 92/103 R X |

FOREIGN PATENT DOCUMENTS

| | | | |
|---|---|---|---|
| 0265835 | 5/1988 | European Pat. Off. | 901/27 |
| 0257791 | 6/1988 | Fed. Rep. of Germany | 901/22 |
| 0177988 | 7/1989 | Japan | 901/27 |
| 0422580 | 9/1974 | U.S.S.R. | 901/22 |
| 0837845 | 6/1981 | U.S.S.R. | 901/22 |
| 1294517 | 3/1987 | U.S.S.R. | 901/22 |
| 1315290 | 6/1987 | U.S.S.R. | 901/22 |
| 1397282 | 1/1988 | U.S.S.R. | 901/27 |
| 1484687 | 6/1989 | U.S.S.R. | 901/22 |
| 2100826 | 1/1983 | United Kingdom | 901/22 |

*Primary Examiner*—Edward K. Look
*Assistant Examiner*—John Ryznic
*Attorney, Agent, or Firm*—Sughrue, Mion, Zinn, Macpeak & Seas

[57] ABSTRACT

A bendable actuator includes a plurality of elastic extensible members arranged in parallel and extensible in axial directions when a pressurized fluid is supplied into the elastic extensible members. The actuator further includes connecting members arranged in a manner embracing the elastic extensible members and connecting respective ends of the elastic extensible members. The actuator includes an elastic member arranged between the connecting members and surrounding the elastic extensible members to resist extending forces of the elastic extensible members and to restrain bending of the elastic extensible members. With this arrangement, linear extension and bending of the actuator are realized by adjusting supply and exhaust of the pressurized fluid into and from the elastic extensible members.

7 Claims, 3 Drawing Sheets

BENDABLE ACTUATOR

BACKGROUND OF THE INVENTION

This invention relates to a bendable actuator including at least two elastic extensible members arranged in parallel and extensible in axial directions upon being supplied with a pressurized fluid. The actuator is linearly extensible and/or bendable by adjusting supplying and exhausting a pressurized fluid into and from the elastic extensible members.

Electric motors, hydraulic cylinders and the like have been known as actuators. However, an electric motor usually requires a speed reduction mechanism including gear trains to increase weight and space to be occupied by the actuator and often suffers a limitation of operable range. Moreover, due to unavoidable spark, use of the actuator in an explosion atmosphere is limited.

In contrast herewith, with hydraulic cylinders including motors and cylinders actuated with oil pressure, in addition to the above problems it is difficult to completely prevent leakage of operating oil so that environmental contamination by the leaked oil could not be avoided. Moreover, the temperature and purity of the operating oil must be finely managed and there are many other problems to be solved in management of the hydraulic cylinders.

In addition, in order to obtain an actuator having a high power, it will be unavoidably large sized.

SUMMARY OF THE INVENTION

It is an object of the invention to provide an improved actuator which eliminates all the disadvantages of the prior art and is small-sized and light weight and free from environmental contamination and which exhibits high power.

In order to accomplish the object, a bendable actuator according to the invention comprises at least two elastic extensible members arranged in parallel and extensible in axial directions when a pressurized fluid is supplied into the elastic extensible members, connecting members arranged to embrace the elastic extensible members and to connect respective ends of the elastic extensible members, and an elastic member arranged between the connecting members and surrounding the elastic extensible members to resist extending forces of the elastic extensible members and to restrain bending of the elastic extensible members, thereby realizing linear extension and bending of the actuator by adjusting supply and exhaust of the pressurized fluid into and from the elastic extensible members.

When the pressurized fluid is supplied equally into the elastic extensible members arranged in parallel and whose ends are fixed to the connecting members, respectively, the elastic extensible members are extended equal distances. However, if the pressurized fluid is supplied unequally into the elastic extensible members, extended distances of the elastic extensible members are different corresponding to the difference in pressure and the supplied amount of the pressurized fluid. Therefore, the elastic extensible members and hence the actuator are curved corresponding to difference in the extended distances of the elastic extensible members. In such a case, moreover, as the elastic member surrounding the elastic extensible members restrains the bending of the extended elastic extensible members, the actuator would be bent in a stable condition.

Moreover, the elastic extensible members belong to the air-bag type and very simple in construction and do extending movement in longitudinal directions without expanding in radially outward directions. Therefore, the invention provides an actuator which is small-sized and light weight and exhibits high power output.

The invention will be more fully understood by referring to the following detailed specification and claims taken in connection with the appended drawings.

DETAILED EXPLANATION OF THE PREFERRED EMBODIMENTS

Figure 1:
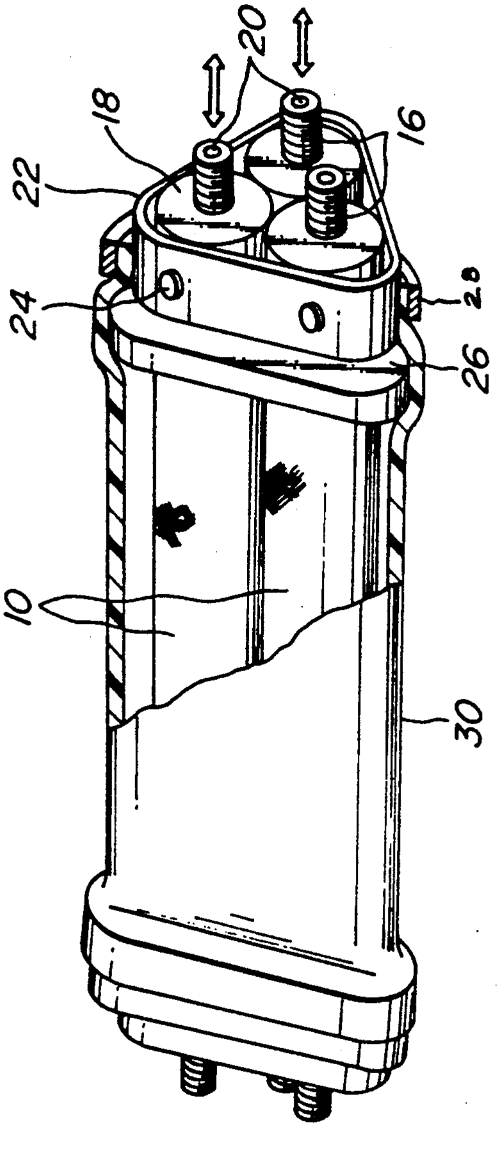
FIG. 1 is a perspective view illustrating the actuator according to the invention in partial section.

FIG. 1 is a perspective view illustrating the actuator using an elastic extensible members according to the invention. Three elastic extensible members 10 are arranged in parallel with each other in this embodiment.

Figure 2:
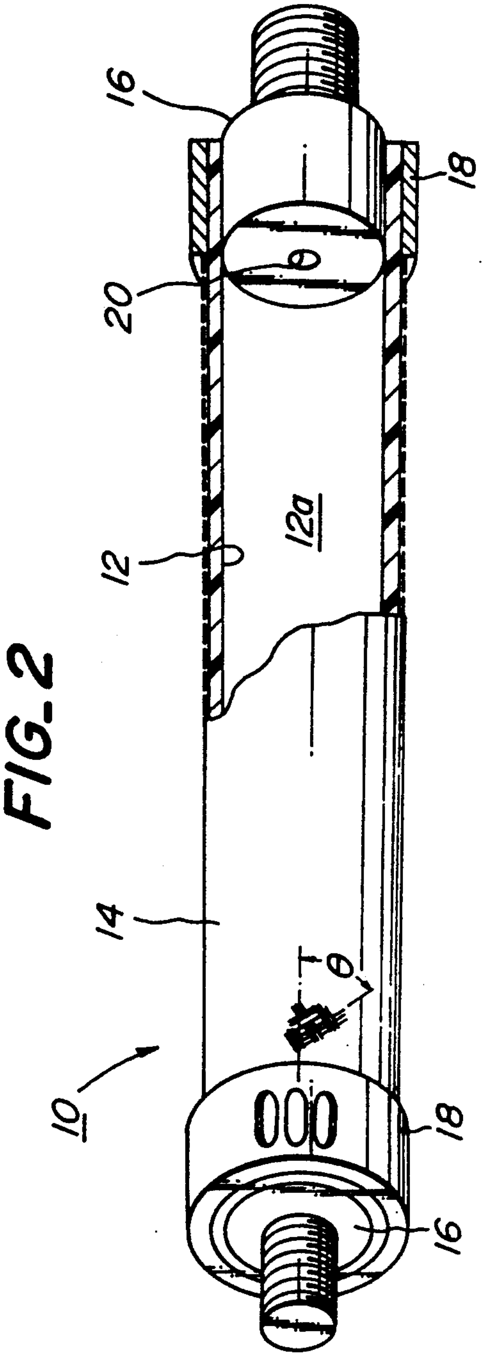
FIG. 2 is an elastic extensible member to be preferably used for the actuator according to the invention.

In each of the elastic extensible members, as shown in FIG. 2, a tubular body 12 is surrounded by a reinforcing braided structure 14 and closed at both open ends by closure members 16. In order to securely prevent the tubular body 12 and the reinforcing braided structure 14 from being dislodged, these members are externally pressed by clamp sleeves 18 to form elastic extensible member 20.

The tubular body 12 is preferably made of a rubber or rubber-like elastomer or other materials equivalent thereto, which are impermeable to pressurized fluids such as pressurized air, liquid and the like and superior in flexibility permitting of the tubular body sufficiently expanding when the pressurized fluid is applied. The reinforcing braided structure 14 is reinforced by cords which are organic or inorganic high tensile fibers, for example, polyester fibers or aromatic polyamide fibers (trade name, KEVLAR) or twisted or nontwisted filament bundles such as very fine metal wires. Braided structures may be used whose braided angles change from an initial braided angle $\theta_0$ to a so-called an angle of repose (54°44′) at the maximum elongation of the tubular body 12 in the axial direction when applied the pressurized fluid. Moreover, the initial braided angle $\theta_0$ may be selected within angles of the order of 70° to 85°.

At least one of the closure members 16 closing both the ends of the tubular body 12 and the reinforcing braided structure 14 is formed with a connecting aperture 20 for supplying and exhausting a pressurized fluid into and out of an internal space 12*a* of the tubular body 12.

These closure members 16 may be made of a metal. However, it may be preferably made of so-called engineering plastics in order to make the actuator 10 more light weight.

In the embodiment, moreover, each of the closure members 16 is provided on an external end face with a projection extending in its axial direction. The projection is formed with male screw which is threadedly engaged with a female screw formed in a suitable fixing member or a driven member, thereby enabling the actuator to be integrally fixed to such a member. However, the connection is not limited to such a thread-screw connection, but various modifications can be effected. For example, the projection is formed with a pin-shaped aperture, and a pivot pin secured to a fixing member or driven member is inserted into the pin-shaped aperture for this purpose.

Figure 3A:
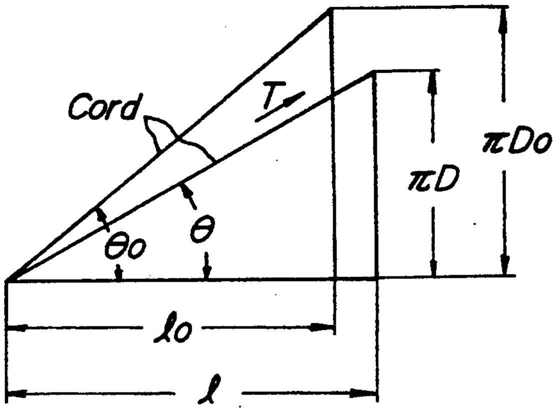
FIGS. 3*a* and 3*b* are explanatory views illustrating the operation of the elastic extensible member shown in FIG. 2 and the relationship between the extending force and the extension coefficient.
Figure 3B:
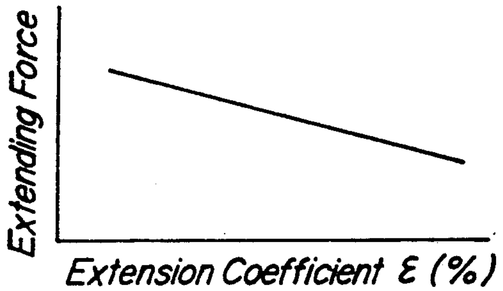

The operation of the actuator 10 according to the invention will be explained referring to FIGS. 3*a* and 3*b*. For the sake of clarity, it assumed that lengths of cords constituting the reinforcing braided structure 14 are invariable.

When an initial braided angle of the cords constituting the reinforcing braided structure 14 relative to the axis of the tubular body 12 is $\theta_0$ and the braided angle of the cords after elongated or deformed by applying the pressurized fluid is $\theta$, the following equations are obtained from balance of forces in the axial directions of the tubular body 12 and circumferential directions intersecting the axial directions.

$$nT\cos\theta = \pi/4 \cdot D^2P + F \ldots.. \quad (1)$$

$$2nT\sin\theta = \pi D^2/\tan\theta \cdot P \ldots.. \quad (2)$$

, where n is the number of the cords, T is tensile force acting upon each cord of the reinforcing braided structure, D is a diameter of the reinforcing braided structure at a center of the cord, P is a pressure of the pressurized fluid applied to the elastic extensible member 20, and F is an extending force caused in the elastic extensible member.

Eliminating T from the equations (1) and (2), equation (3) is obtained.

$$F = nT\cos\theta - \pi/4 \cdot D^2P = \pi 4 \cdot D^2P(1\text{-}2/\tan^2\theta) \ldots \quad (3)$$

It can be understood from equation (3) that the extensible force becomes zero, when $\theta$ is an angle of repose, that is to say, 54°44′.

On the other hand, consideration of the fact that the lengths of the cords are invariable, $\pi D/\sin\theta = \pi D_0/\sin\theta_0$, which can be changed into an equation (4).

$$D = \sin\theta/\sin\theta_0 \cdot D_0 \ldots.. \quad (4)$$

On the other hand, an extension coefficient $\epsilon$ of the elastic extensible member is obtained by considering of FIG. 2*b* as follows.

$$\epsilon = (l\text{-}l_0)l_0 = (\cos\theta - \cos\theta_0)/\cos\theta_0$$

and $$\cos\theta = (1+\epsilon)\cos\theta_0 \ldots.. \quad (5)$$

In this case, the extending force F is obtained by substituting the equations (4) and (5) into (3).

$$F = \pi/4 \cdot D_0^2P \cdot K \ldots.. \quad (6)$$

where $K = 1/\sin^2\theta_0 \cdot (1 - 3(1+\epsilon)^2\cos^2\theta_0)$

On the other hand, as $\pi/4 \cdot D_0^2P$ is equivalent to the output of the cylinder having the effective diameter $D_0$, it is understood that the extending force F of the elastic extensible member 20 is substantially K times the output of the cylinder having the effective diameter $D_0$.

Therefore, in the case, for example, that the initial braided angle $\theta_0$ is 80°, when the extension coefficient $\epsilon$ of the elastic extensible member is zero (%), $K \simeq 0.94$. If $\epsilon \simeq 20\%$, $K \simeq 0.90$. If $\epsilon = 50\%$, $K \simeq 0.82$. The relationships between the extension coefficient $\epsilon$ and the extending force F are shown in FIG. 3*b*.

Moreover, it is assumed that the initial braided angle $\theta_0$ of cords of the reinforcing braided structure is 80° and in applying pressurized fluid the cords have been deformed to the angle of repose (54°44′). The extension coefficient $\epsilon$ in this case is 2.32 from the equation (5).

It is understood from the above fact that with the elastic extensible member according to the invention, extending forces and extended distances can be set in large values so that freedom of design is very large in comparison with those of the air-bag type of the prior art.

On the other hand, even if such a great extension is effected, the diameter D of the elastic extensible member after deformation is indicated from the equation (4) as follows.

$$D = \sin(54°44')/\sin(80°) \cdot D_0 \simeq 0.83D$$

Therefore, it is understood that the elastic extensible member does not expand in radial directions with exception of the axial movements. Accordingly, the actuator needs no space for accommodating expansion in radial directions as the core air-bag type actuators of the prior art.

With the actuator shown in FIG. 1, three elastic extensible members are arranged in parallel, whose ends are directly or indirectly integrally connected by means of connecting members 22. The connecting members 22 require only to be able to connect the ends of the elastic extensible members, respectively. In this embodiment, the elastic extensible members are arranged adjacent and in parallel with each other and clamped by the connecting members 22 practically forming a triangle in section substantially circumscribing the clamp sleeves 18 with the aid of set screws 24 threadedly engaging screw-apertures formed in the connecting members 22.

The connecting members 22 have formed on their opposing ends flanges 26 radially extending outward.

The flanges 26 serve in cooperation with binding belts 28 to fix an elastic member 30 arranged between the opposing connecting members 22 thereto. With this arrangement, both ends of the elastic member 30 extending axially outwardly beyond the flanges 26 are fixed to the connecting members 22.

The elastic member 30 is needed to resist the extending force of the elastic extensible members and to restrain bending of the elastic extensible members to ensure a required curved configuration. In this embodiment, a cylindrical sheet made of a rubber or rubber-like elastic material having a suitable elastic characteristics is used as the elastic member 30. However, the elastic member is not limited such a cylindrical sheet. A tension spring may be used for this purpose. In the same manner, the connecting members 22 are not limited to those in the above embodiment. For example, a plurality of elastic extensible members may be bound by belt-like members instead of the connecting members 22. Moreover, instead thereof the clamp sleeves 18 may be directly connected or welded with each other.

The operation of the actuator constructed as above described will be explained hereinafter. It is assumed that the elastic extensible members constituting the actuator are connected through pressure control valves to a suitable operating pressure source, for example, an air compressor.

Figure 4A:
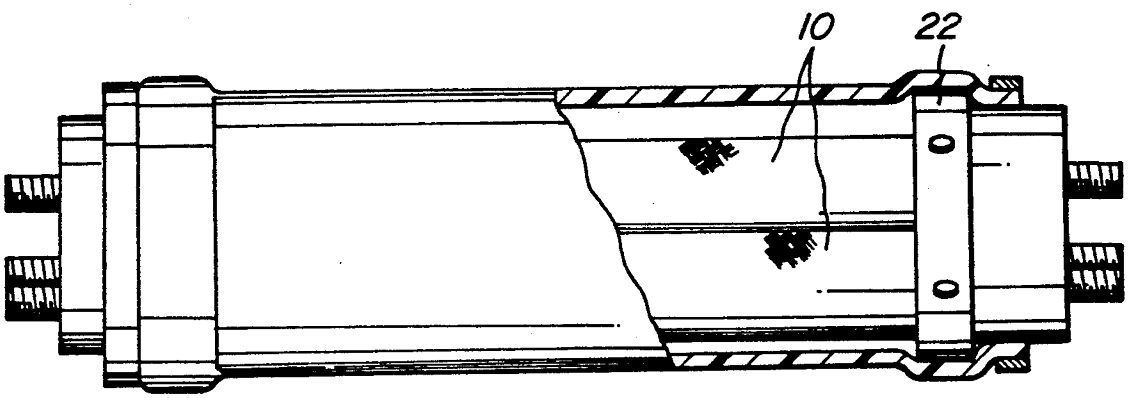
FIGS. 4*a* and 4*b* are views illustrating extended and curved conditions of the actuator shown in FIG. 1, respectively.

When the pressurized fluid is supplied in an substantially equal amount to the respective elastic extensible members, extended distances of the respective elastic extensible members are substantially equal so that the actuator extends linearly as shown in FIG. 4*a*.

If the pressurized fluid is exhausted from the respective elastic extensible members, the actuator immediately returns to its original dimensions with the aid of the returning force of the elastic extensible members and the returning force of the cylindrical sheet as an elastic member.

Figure 4B:
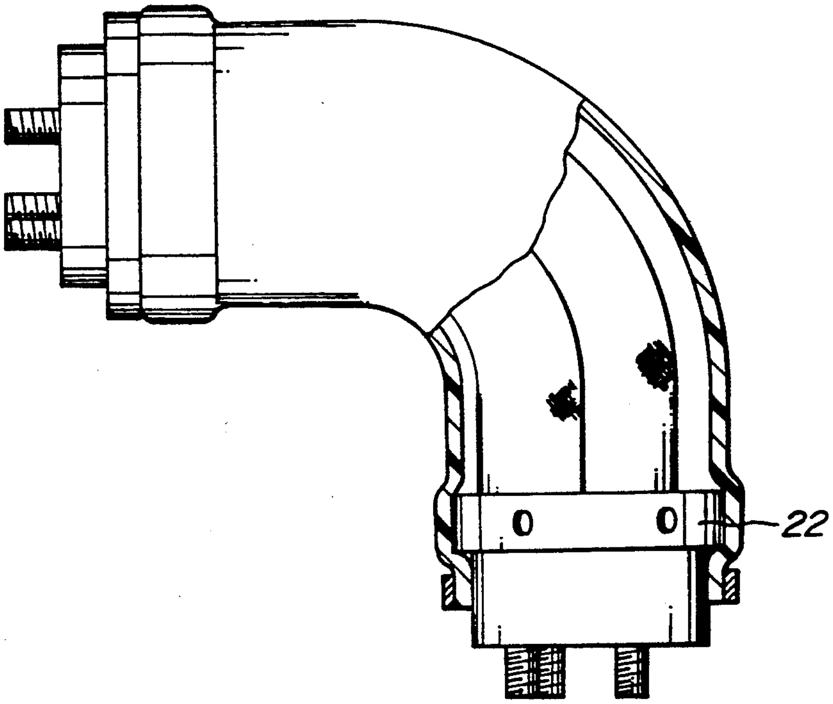

On the other hand, when the pressurized fluid is supplied in different amounts into the respective elastic extensible members, extending distances of the respective elastic extensible members are different corresponding to difference in supplied pressure so that the actuator is bent or curved corresponding to the difference in supplied pressure. In other words, the actuator is curved in a manner that the elastic extensible member of the small extended distance is located on an inner side and the elastic extensible member of the large extended distance is located on an outer side as schematically shown in FIG. 4*b*. Moreover, under the curved condition the cylindrical sheet arranged on the outside of the elastic extensible members restrains the bending of the extended elastic extensible members to guarantee the curved configuration of the actuator.

The actuator can of course be curved by exhausting the pressurized fluid in different amounts from the respective elastic extensible members linearly extended with the pressurized fluid.

The invention is not limited to the above embodiments and various changes and modifications may be made in the invention without departing from the spirit and scope thereof. The number of the elastic extensible members may be two or four or more corresponding to the extent of output and curve of the actuator. Moreover, a plurality of the actuators may be arranged in series and/or in parallel.

As can be seen from the above description, the actuator according to the invention can adjust its curved extent corresponding to supply and exhaust of the pressurized fluid into and out of the respective elastic extensible members of the air-bag type which effectively convert the energy of the pressurized fluid into kinetic energy. Therefore, the actuator according to the invention is small-sized and light weight. It is not necessary to consider any leakage of the pressurized fluid in extending motion of the elastic extensible members so that there is no risk of environmental contamination of leaked pressurized fluids.

Moreover, with the actuator according to the invention, the extended distance and extending force are large in comparison with actuators of air-bag type of the prior art. Therefore, the actuator according to the invention is high in freedom of design and wide in applicable range.

What is claimed is:

1. A bendable actuator comprising at least two elastic extensible members arranged in parallel and extensible in axial directions when a pressurized fluid is supplied into the elastic extensible members, connecting members arranged to embrace the elastic extensible members and to connect respective ends of the elastic extensible members, and an elastic member arranged between the connecting members and surrounding the elastic extensible members to resist extending forces of the elastic extensible members and to restrain bending of the elastic extensible members, thereby realizing linear extension and bending of the actuator by adjusting supply and exhaust of the pressurized fluid into and from the elastic extensible members.

2. A bendable actuator as set forth in claim 1, wherein said elastic member comprises a tubular body, a reinforcing braided structure surrounding the tubular body, closure members closing both open ends of the tubular body, and clamp sleeves for preventing separation of the tubular body and the reinforcing braided structure from said closure members.

3. A bendable actuator as set forth in claim 1 further comprising a third elastic extensible member, wherein said connecting members are triangular members circumscribing clamping sleeves provided at ends of the three elastic extensible members.

4. A bendable actuator as set forth in claim 1, wherein said elastic member is a cylindrical sheet made of an elastic material.

5. A bendable actuator as set forth in claim 1, wherein said connecting members are provided with extending flanges.

6. A bendable actuator as set forth in claim 5 further comprising a binding belt to fix said elastic member to said connecting member.

7. A bendable actuator as set forth in claim 3 further comprising means to fix said connecting members to said clamping sleeves.

* * * * *